United States Patent [19]

Kawaguchi

[11] Patent Number: 5,053,167
[45] Date of Patent: Oct. 1, 1991

[54] METHOD FOR THE PREPARATION OF AN INTEGRAL RUBBER ARTICLE HAVING ELECTRICALLY INSULATING AND CONDUCTIVE PARTS

[75] Inventor: Toshiyuki Kawaguchi, Tokyo, Japan

[73] Assignee: Shin-Etsu Polymer Co., Ltd., Tokyo, Japan

[21] Appl. No.: 366,422

[22] Filed: Jun. 15, 1989

[30] Foreign Application Priority Data

Jun. 17, 1988 [JP] Japan .................................. 63-149733
Jun. 17, 1988 [JP] Japan .................................. 63-149734
Jun. 20, 1988 [JP] Japan .................................. 63-151550

[51] Int. Cl.$^5$ ............................................. H01B 1/06
[52] U.S. Cl. .................................... 252/511; 525/477; 525/478; 528/503
[58] Field of Search ................. 252/511, 506; 524/495, 524/496; 525/370, 387; 528/502, 503, 474, 475, 478, 477

[56] References Cited

U.S. PATENT DOCUMENTS 4,820,446 4/1989 Prud'Homme ...................... 252/511
4,822,523 4/1989 Prud'Homme ...................... 252/511
4,898,689 2/1990 Hamada et al. ...................... 252/511

*Primary Examiner*—Josephine Barr
*Attorney, Agent, or Firm*—Wenderoth, Lind & Ponack

[57] ABSTRACT

A method is disclosed for the preparation of an integral silicone rubber article having an electrically insulating part and an electrically conductive part, in which the adhesive bonding between the two parts is greatly enhanced and each part exhibits a remarkably small permanent compression set. The method comprises the steps of preparing a first cured silicone rubber body from a first silicone rubber composition and then curing a second silicone rubber body in contact with the first cured silicone rubber body under specified conditions while either one of the first and the second silicone rubber composition contains a substantial amount of a carbon black to give conductivity. Both of the two compositions comprises a non-acyl type organic peroxide, e.g., dicumyl peroxide, as a curing agent of the organopolysiloxane. Characteristically, either one or both of the two composition, of which the organopolysiloxane has at least two silicon-bonded vinyl groups in a molecule, comprise, in addition to the above mentioned organic peroxide, a combination of an organohydrogenpolysiloxane and a platinum catalyst so that the composition or compositions are curable in two ways of, one, the peroxide-induced crosslinking and, the other, the platinum-catalyzed addition reaction between the silicon-bonded vinyl groups and silicon-bonded hydrogen atoms.

16 Claims, No Drawings

METHOD FOR THE PREPARATION OF AN INTEGRAL RUBBER ARTICLE HAVING ELECTRICALLY INSULATING AND CONDUCTIVE PARTS

BACKGROUND OF THE INVENTION

The present invention relates to an integral rubber article having an electrically insulating part and an electrically conductive part and a method for the preparation of such a rubber article. More particularly, the invention relates to a vulcanized silicone rubber article having an electrically insulating part and an electrically conductive part which serves as an antistatic functional component of an electric or electronic instrument kept prolongedly under compression or under repetition of compression and pressure-release, of which the conductive part serves, for example, as a fixed or movable electrical contacting point as well as an efficient and reliable method for the preparation of such a rubber article having portions of different properties integrated together.

Vulcanized rubber articles having an electrically insulating part and an electrically conductive part integrated together are widely used as a functional component in various kinds of electronic instruments such as a so-called rubber contact as a part of pocketable or desktop calculators, telephones, remote controllers of television sets, terminals of computers and the like, interconnectors for electrically connecting terminal electrodes on two circuit boards or on a display unit and a circuit board for driving the display unit, antistatic paper-feed rubber rollers in photocopying machines, facsimile machines, word processors and the like, rubber-made platen rollers, rubber-made contact-point rollers, electromagnetic shielding materials and so on.

A method is proposed in Japanese Patent Publication No. 56-41417 for the preparation of an integral rubber article having an electrically insulating part and an electrically conductive part, according to which either one of the insulating and conductive rubber compounds is subjected to vulcanization by use of an organic peroxide having an apparent activation energy of at least 33 kcal/mole as a vulcanizing agent to effect firm bonding to the other. Japanese Patent Publications Nos. 61-39188 and 61-34982 propose that the conductive rubber compound is freed from the trouble of vulcanization inhibition by the carbon black compounded therein as a conductivity-imparting agent when the vulcanizing agent is a non-acyl type organic peroxide or the rubber compound is a silicone rubber curable by the mechanism of the hydrosilation reaction in the presence of a platinum catalyst, referred to as an addition-type silicone rubber hereinbelow, capable of being cured at a relatively low temperature within a relatively short time so as to decrease the energy consumption and increase the productivity.

The above mentioned silicone based integral rubber article having an electrically insulating part and an electrically conductive part is advantageous in respect of the reliableness in the adhesive bonding of the two different rubber parts and the productivity though with several disadvantages. When either one or both of the insulating and conductive parts are made from an addition-type silicone rubber, for example, a serious problem is encountered by using the rubber part prolongedly under heavy compression or with frequent repetition of compression or deformation and release of the compressive or deforming force for several millions of times or more that a large permanent compression set is caused in the rubber part so that the rubber article no longer works as a rubbery elastomeric body with a consequent great decrease in the performance as a functional component. Namely, such a silicone-based integral rubber article in the prior art is unsatisfactory in respect of the behavior of permanent compression set without decreasing the reliability in the adhesive bonding of the two parts. In rubber contacts of the prior art, for example, the contacting point made of the conductive rubber is compressed and depressed repeatedly by being brought into contact with the electrode made of a copper foil or a conductive paste having a certain hardness and thickness to cause a stress at the interface between the parts of the conductive and insulating rubber parts leading to eventual separation of the parts or failure of electrical connection unless the pushing pressure on the push button is substantially increased. At least, it is unavoidable that the finger touch on the key board switch is subject to a change due to the increase in the necessary stroke in the long run of use as a result of the permanent compression set caused in the contacting point.

In a rubber-made interconnector used by being press-held between the terminal electrodes on a display unit and a circuit board for driving the display unit, the contact resistance between the electrodes and the interconnector is reduced with an increase in the contacting pressure by utilizing the elastic resilience of the rubber-made interconnector under compression. When deformation or permanent compression set is caused in the interconnector, the contacting pressure may be decreased consequently with an increase in the contact resistance which is responsible for the decrease in the quality of the display on the display unit. When the display unit is constructed with a substrate made of a material susceptible to fracture, such as a glass plate, supported by utilizing the elastic resilience of the rubber-made interconnector, the permanent compression set caused in the interconnector may eventually lead to a loss of the holding security of the glass substrate which is then subject to a damage by a mechanical impact or shock. Even when the display unit is not destroyed by the mechanical shock, it is sometimes unavoidable that failure in contacting is caused between the terminal electrodes and the interconnector due to relative displacement therebetween as a result of the mechanical shock, especially, when the arrangement pitch of the terminal electrodes on the display unit is so fine as to be 0.7 mm or smaller leading to an error in the display.

As in an antistatic rubber roller which is rotated under a permanently lasting compression in a radial direction, the portion of the rubber under compression is perpetually in movement under the squeezing force as the roller is rotated. Such a condition is very severe for the rubber roller to maintain the rubbery elasticity so that the rubber roller can no longer serve to smoothly and reliably feed sheets of paper to the machine when deformation or permanent compression set has been caused in the rubber roller. It is sometimes unavoidable that a failure is caused in the adhesive bonding between the conductive and insulating rubber-made parts so that the rotation of the core shaft can no longer be transmitted reliably to the outer rubber layer. In a rubber-made platen roller in printers, any depression on the surface of the rubber roller naturally results in uneven printing.

SUMMARY OF THE INVENTION

The present invention accordingly has an object to provide a novel and improved silicone rubber article having an electrically insulating part and an electrically conductive part integrated together without the above described problems and drawbacks in the conventional rubber articles of such a type as well as a method for thr preparation of such an integral rubber article.

Thus, the method of the present invention for the preparation of an integral silicone rubber article having an electrically insulating part and an electrically conductive part comprises the steps of: (a) curing a first silicone rubber composition comprising an organopolysiloxane and a non-acyl organic peroxide as a curing agent by heating to give a first cured silicone rubber body; (b) bringing the first cured silicone rubber body into contact with a second silicone rubber composition comprising an organopolysiloxane and a non-acyl organic peroxide; and (c) curing the second silicone rubber composition in contact with the first cured silicone rubber body by heating at a temperature of 100° C. to 180° C. for a length of time of 5 seconds to 20 minutes to give a second cured silicone rubber body which is adhesively and integrally bonded to the first cured silicone rubber body, either one of the first and the second silicone rubber compositions further comprising a carbon black in such an amount as to impart the cured silicone rubber body of the composition with substantial electroconductivity and at least one of the first and the second silicone rubber compositions comprising an organopolysiloxane having at least two vinyl groups bonded to the silicon atoms in a molecule as the organopolysiloxane and further comprising an organohydrogenpolysiloxane and a platinum compound as a catalyst.

DETAILED DESCRIPTION OF THE PREFERRED EMBODIMENTS

As is described above, the essential steps in the inventive method are the steps (a), (b) and (c). In step (a), a first silicone rubber composition, which contains or does not contain a carbon black as a conductivity-imparting agent, comprising a non-acyl organic peroxide as a curing agent is shaped and heated at a specified temperature and for a specified length of time into a first cured silicone rubber body which is conductive or insulating depending on the presence or absence of the carbon black. In step (b), the thus prepared first cured silicone rubber body is brought into contact with a second silicone rubber composition also comprising an organopolysiloxane and a non-acyl type organic peroxide as a curing agent. The second silicone rubber composition does not contain or contains a carbon black as a conductivity-imparting agent corresponding to presence or absence of a carbon black in the first silicone rubber composition, respectively. Characteristically, the organopolysiloxane in either one or both of the first and the second silicone rubber compositions is an organopolysiloxane having at least two vinyl groups bonded to the silicon atoms in a molecule and the composition or compositions further comprise an organohydrogenpolysiloxane and a platinum compound in a catalytic amount. This means that the silicone rubber composition of the vinyl-containing organopolysiloxane admixed with the organohydrogenpolysiloxane and the organic peroxide has a possibility of two way curing by the peroxide curing and the curing by the addition reaction. In step (c), the second silicone rubber composition which is in contact with the first cured silicone rubber body is heated, for example, in a metal mold so that the second silicone rubber composition is cured into a second cured silicone rubber body which is integrally and adhesively bonded to the first cured silicone rubber body.

In the following, detailed description is given on each of these three steps and the materials used therein.

The first silicone rubber composition, which is cured in step (a) into a cured silicone rubber body, comprises, as the essential ingredients, and organopolysiloxane and a non-acyl organic peroxide as the curing agent. The type of the organopolysiloxane is not particularly limitative but it is preferably an organopolysiloxane having, in a molecule, at least two vinyl groups bonded to the silicon atoms exemplified by a copolymeric organopolysiloxane composed of the dimethyl siloxane moiety and methyl vinyl siloxane moiety, a copolymeric organopolysiloxane composed of the dimethyl siloxane moiety, methyl phenyl siloxane moiety and methyl vinyl siloxane moiety, a copolymeric organopolysiloxane composed of the dimethyl siloxane moiety, methyl 3,3,3-trifluoropropyl siloxane moiety and methyl vinyl siloxane moiety and the like. The terminal group at each molecular chain end can be a silanol group, trimethyl silyl group, dimethyl vinyl silyl group, methyl phenyl vinyl silyl group and the like without particular limitations.

The curing agent compounded in the first silicone rubber composition is a non-acyl organic peroxide exemplified by ketone peroxides represented by the general formula HO-(-O-CR$_2$-O-)n-OH, peroxydicarbonates represented by the general formula R$^1$-O-CO-O-O-CO-O-R$^2$, hydrocarbyl hydroperoxides represented by the general formula R-O-O-H, dialkyl peroxides represented by the general formula R$^1$-O-O-R$^2$, ketal peroxides represented by the general formula R$^1$-C(O-O-R)$_2$-R$^2$, ester peroxides represented by the general formula R-CO-O-O-R$^1$ and the like, in which R, R$^1$ and R$^2$ are each a monovalent hydrocarbon group and n is a positive integer. Those peroxide compounds usable in the inventive method include ketone peroxides, e.g., methyl ethyl ketone peroxide, dialkyl peroxides, e.g., di-tert-butyl peroxide, tert-butyl cumyl peroxide, dicumyl peroxide, α,α'-bis(tert-butylperoxy-misopropyl) benzene, 2,5-dimethyl-2,5-di(tert-butylperoxy) hexane, dicumyl peroxide, 2,5-dimethyl-2,5-di(tert-butylperoxy) hexane and 2,5-dimethyl-2,5-di(tert-butylperoxy) hexene-3, ketal peroxides, e.g., 1,1-bis-(tert-butylperoxy)-3,3,5-trimethyl cyclohexane, 1,1-bis(tert-butyl-peroxy) cyclohexane, 2,2-bis(tert-butylperoxy) octane and n-butyl-4,4-bis(tert-butylperoxy) valerane, peroxy ester compounds, e.g., tert-butylperoxy-2-ethyl hexanoate, tert-butylperoxy benzoate and 2,5-dimethyl-2,5-di(benzoylperoxy) hexane, and peroxy dicarbonate compounds, e.g., tert-butylperoxy isopropyl dicarbonate, of which dicumyl peroxide and 2,5-dimethyl2,5-di(tert-butylperoxy) hexane are preferred. Acyl-type organic peroxides, such as benzoyl peroxide, 2,4-dichlorobenzoyl peroxide and the like, are not preferable as the curing agent. This is presumably because, when an acyl-type peroxide is contacted with carbon black, which is contained either in the first silicone rubber composition or in the sec-ond silicone rubber composition, the free radicals produced by the decomposition of the acyl-type peroxide are readily captured by the carbon black particles to cause a loss of the apparent activation energy inherently possessed by the peroxide so that the curing reaction of the organopolysiloxane is inhibited. In this regard, the apparent activation energy of the nonacyl organic peroxide is generally much larger than that of the acyl-type organic peroxides. The amount of the non-acyl organic peroxide in the first silicone rubber composition is in the range from 0.1 to 5 parts by weight per 100 parts by weight of the organopolysiloxane. When the amount thereof is too small, no full curing of the organopolysiloxane can be achieved. When the amount of the organic peroxide is too large, on the other hand, the vulcanizate of the silicone rubber composition may be poor in the properties as a rubbery elastomer in addition to a decrease in the heat resistance of the vulcanizate.

The first silicone rubber composition usually contains a reinforcing filler, preferably, such as fumed silica fillers, precipitated silica fillers and the like, optionally, surface-treaterd with a silane coupling agent with an object to decrease hydrophilicity of the silica surface. The amount of the reinforcing filler in the first silicone rubber composition is in the range from 5 to 200 parts by weight per 100 parts by weight of the organopolysiloxane when the first silicone rubber composition does not contain a carbon black as a conductivity-imparting agent. When the first silicone rubber composition contains a substantial amount of a carbon black, the amount of the silica-based reinforcing filler should be decreased accordingly since carbon blacks may have a reinforcing effect. For example, the amount of the siliceous filler is 120 parts by weight or smaller per 100 parts by weight of the organopolysiloxane. It is of course optional that the first silicone rubber composition further contains additives conventionally used in silicone rubber compositions including extenders, heat-resistance improvers, pigments and the like according to need.

As is mentioned before, it is a matter of choice depending on the desired silicone rubber article of the invention that the first silicone rubber composition is electrically conductive or non-conductive by compounding or not compounding with a substantial amount of a carbon black. Type of the carbon black is not particularly limitative but preferably it is a furnace black or acetylene black. Graphite powders, carbon fibers and carbon whiskers can be used as an equivalent material of carbon blacks. The amount of the carbon black in the first silicone rubber composition of course depends on the desired conductivity of the composition after curing. As a rough measure, the amount of a carbon black in the composition is in the range from 5 to 75 parts by weight per 100 parts by weight of the organopolysiloxane. When the amount of the carbon black is too small, the composition cannot be imparted with electroconductivity as high as desired as a matter of course. When the amount of the carbon black is too large, on the other hand, certain disadvantages are caused in the workability and curability of the composition as well as in the properties of the vulcanizate with no further improvement in the conductivity.

The above described essential and optional ingredients are uniformly compounded in a suitable rubber-blending machine to give the first silicone rubber composition which is, in step (a), shaped and heated into a cured silicone rubber body such as a terminal electrode on a circuit board. The curing reaction is usually complete by heating the composition in a metal mold under compression at a temperature in the range from 100° to 180° C. for 5 seconds to 20 minutes or, preferably, from 1 to 20 minutes depending of the type of the process of molding and vulcanization such as compression molding, injection molding and the like.

The thus obtained first cured silicone rubber body is then brought into contact with a second silicone rubber composition which is then subjected to curing so as to form firm bonding with the first cured silicone rubber body. The second silicone rubber composition comprises, as the essential ingredients, an organopolysiloxane and a non-acyl type organic peroxide as a curing agent. The organopolysiloxane is preferably an organopolysiloxane having at least two vinyl groups bonded to the silicon atoms in a molecule which has been described above for the first silicone rubber composition and the same one can be used in the second silicone rubber composition. The non-acyl organic peroxide is also described above. The amount of the non-acyl organic peroxide also can be the same as in the first silicone rubber composition. The second silicone rubber composition also can contain a reinforcing filler. When the first silicone rubber composition is electrically conductive by containing a carbon black, the second silicone rubber copmposition must be insulating so that no carbon black is contained in the second silicone rubber composition. When the first silicone rubber composition does not contain a substantial amount of a carbon black and is insulating, the second silicone rubber composition must contain a substantial amount of a carbon black so as to be conductive.

The most characteristic feature of the inventive method is that either one or both of the first and second silicone rubber compositions are of the addition-curable type of silicone rubber compositions and contain an organohydrogenpolysiloxane and a catalytic amount of a platinum compound in addition to the requirement that the organopolysiloxane is an organopolysiloxane having at least two silicon-bonded vinyl groups in a molecule. Namely, the composition or compositions containing these two additional ingredients have a possibility of two way curing, one, by the organic peroxide and, the other, by the so-called addition reaction between the silicon-bonded vinyl groups in the organopolysiloxane and the silicon-bonded hydrogen atoms in the organohydrogenpolysiloxane as catalyzed by the platinum compound.

Though not particularly limitative, the organohydrogenpolysiloxane has a linear molecular structure represented by the general formula $$R_3Si-O-(-SiR_2-O-)_m-SiR_3,$$

in which R is a hydrogen atom or a monovalent hydrocarbon group selected from the class consisting of methyl, ethyl and phenyl groups and the subscript m is an integer in the range from 10 to 1000. It is essential that at least two but not all of the groups denoted by R in a molecule are hydrogen atoms to pertain to the addition reaction with the silicon-bonded vinyl groups in the organopolysiloxane.

The amount of the organohydrogenpolysiloxane in the silicone rubber composition is usually in the range from 0.5 to 30 parts by weight per 100 parts by weight of the vinyl-containing organopolysiloxane although this ratio is subject to modification depending on the contents of the silicon-bonded vinyl groups and the silicon-bonded hydrogen atoms in the organopolysiloxane and the organohydrogenpolysiloxane, respectively. Stoichiometrically, the addition reaction proceeds between equimolar amounts of the silicon-bonded vinyl groups and silicon-bonded hydrogen atoms so that the molar ratio of the silicon-bonded hydrogen atoms in the organohydrogenpolysiloxane to the silicon-bonded vinyl groups in the organopolysiloxane is usually selected in the range from 0.5 to 6. When this ratio is too small, the excess of the vinyl groups are consumed by the reaction with the organic peroxide. When this ratio is too large, the excess of silicon-bonded hydrogen atoms are also lost by the reaction with the organic peroxide.

The platinum catalyst used in combination with the organohydrogenpolysiloxane can be in an elementary form such as platinum black, platinum sponge and the like but it is preferably a platinum compound such as platinum chloride, chloroplatinic acid and the like as well as a reaction product of chloroplatinic acid and a monohydric alcohol, such as ethyl, isopropyl and 2-ethylhexyl alcohols, and complexes of chloroplatinic acid with an olefin or a vinyl siloxane. The amount of the platinum catalyst is not particularly limitative depending on the desired catalytic activity. The amount is usually in the range from 50 to 2000 ppm by weight as platinum based on the amount of the vinyl-containing organopolysiloxane.

It is further optional that either one or both of the first and second silicone rubber compositions contain other additives such as non-reinforcing fillers or extenders, such as diatomaceous earth, finely pulverized quartz powder, calcium carbonate, titanium dioxide and the like, reaction moderators such as organic nitrogen compounds, alkyne compounds, organic tin compounds and the like, coloring agents and so on according to need.

Assuming that the second silicone rubber composition is the two way-curable composition with admixture of the organohydrogenpolysiloxane and the platinum catalyst, it is important that the curing reaction proceeds in two steps, in the first of which the silicon-bonded hydrogen atoms in the organohydrogenpolysiloxane pertain to the addition reaction with a part of the vinyl groups in the organopolysiloxane and the remaining vinyl grpoups subsequently pertain to the crosslinking reaction with the aid of the non-acyl organic peroxide. Alternatively, the composition is admixed with a reaction moderator for the addition reaction so that the addition reaction between the silicon-bonded hydrogen atoms and the silicon-bonded vinyl groups proceeds at a controlled rate concurrently with the peroxide-induced crosslinking reaction of the silicon-bonded vinyl groups thus enabling one-step curing.

In practicing the inventive method, the first silicone rubber composition, which may be electrically conductive or insulating in the presence or absence, respectively, of a carbon black or may be of the two-way curable type or of the peroxide-crosslinkable type with or without, respectively, of the admixture of the organohydrogenpolysiloxane and the platinum catalyst, is first molded and cured into a first cured silicone rubber body. The method of the molding is not particularly limitative including the methods of compression molding, injection molding, extrusion molding followed by hot-air vulcanization, transfer molding, anaerobic vulcanization and the like. The thus obtained first cured silicone rubber body is then brought into contact with the second silicone rubber composition, for example, in a metal mold and the second silicone rubber composition is cured therein by heating at a temperature in the range froms 100° to 180° C. for 5 seconds to 20 minutes or, preferably, from 1 to 20 minutes so that the second silicone rubber composition is cured into a second cured silicone rubber body which is integrated with and firmly bonded to the first cured silicone rubber body to give an integrally shaped silicone rubber body having a conductive part and an insulating part. The thus obtained silicone rubber body is usually subjected to a secondary curing treatment under the conditions including, for example, a temperature in the range from 200° C. to 250° C. or, preferably, from 200° C. to 220° C. for a length of time of at least 4 hours in an oven without any compressive force on the silicone rubber body. The conditions of the secondary curing treatment naturally depends on the form and wall thickness of the molded silicone rubber body. Assuming that the temperature is 200° C., the length of time should be 4 hours when the wall thickness is 2 mm or smaller, 8 hours when the wall thickness is 2 to 5 mm and 10 hours or longer when the wall thickness is 5 to 50 mm. This secondary curing treatment is important in order to ensure very high adhesive bonding strength betweem the conductive and insulating parts and a sufficiently low permanent compression set in each of these two parts.

To summarize, the inventive method includes following six different types of embodiments depending on the types of the first and the second silicone rubber compositions.

i) First composition: insulating and peroxide-crosslinkable
   Second composition: conductive and two way-crosslinkable
ii) First composition: conductive and two way-crosslinkable
   Second composition: insulating and peroxide-crosslinkable
iii) First composition: conductive and peroxide-crosslinkable
   Second composition: insulating and two way-crosslinkable
iv) First composition: insulating and two way-crosslinkable
   Second composition: conductive and peroxide-crosslinkable
v) First composition: insulating and two way-crosslinkable
   Second composition: conductive and two way-crosslinkable
vi) First composition: conductive and two way-crosslinkable
   Second composition: insulating and two way-crosslinkable It is sometimes further possible that, in the above given embodiments v) and vi), that the curing of the first and the second silicone rubber compositions is conducted in one step by filling a metal mold with these two compositions in contact with each other so that a integrally shaped cured silicone rubber body can be obtained in a single curing step.

In the following, the method of the invention is described in more detail by way of examples, in which the term of "parts" always refers to "parts by weight".

EXAMPLE 1.

A silicone rubber composition prepared by uniformly blending 100 parts of a gum-like copolymeric organopolysiloxane composed of 99.8% by moles of dimethyl siloxane units and 0.2% by moles of methyl vinyl siloxane units and 1.5 parts of dicumyl peroxide was introduced into a metal mold in which the rubber composition was compression-molded at 160° C. under a pressure of 100 kg/cm² for 10 minutes to give a cured silicone rubber body.

Separately, an electrically conductive silicone rubber composition was prepared by first blending 100 parts of the same gumlike organopolysiloxane as used in the above with 50 parts of an acetylene black (Denkablack, a product by Denki Kagaku Kogyo Co.) to give a uniform compound which was then admixed with 0.4 part of a methyl hydrogen polysiloxane having a viscosity of 5 centistokes at 25° C. and composed of 50% by moles of dimethyl siloxane units and 50% by moles of methyl hydrogen siloxane units with trimethyl silyl groups at the molecular chain ends, 0.1 part of an isopropyl alcohol solution of chloroplatinic acid containing 0.34% by weight of platinum, 0.02 part of methyl butynol and 1.5 parts of dicumyl peroxide.

This conductive silicone rubber composition and the insulating cured silicone rubber body were introduced in contact with each other into another metal mold in which they were compression molded at 120° C. under a pressure of 100 kg/cm² for 10 minutes to give an integrally shaped silicone rubber body consisting of the insulating cured silicone rubber body and the vulcanizate of the carbon black-loaded conductive silicone rubber composition. The integral silicone rubber body was subjected to the secondary curing by heating in an oven at 220° C. for 10 hours.

The thus obtained integral silicone rubber body was tested for the bonding strength at the interface between the insulating and conductive parts by holding the respective parts with the chucks of a tensile tester to be pulled apart. The result was that cohesive failure took place within the conductive silicone rubber without separation at the interface. Further, a test of permanent compression set was undertaken for the insulating and conductive parts after keeping the respective silicone rubber parts under 20% compression at 150° C. for 22 hours to find 10% and 9% permanent compression set for the conductive and insulating silicone rubbers, respectively. For comparison, the same test of the permanent compression set as above was undertaken for another integral silicone rubber body prepared in the same manner as above excepting omission of the secondary curing to find 13% and 10% permanent compression set for the conductive and insulating silicone rubbers, respectively.

For further comparison, the same test as above was repeated excepting omission of the dicumyl peroxide in the formulation of the conductive silicone rubber composition to find that the permanent compression set after the secondary curing at 220° C. for 10 hours was 22% or 10% for the conductive and insulating parts, respectively.

EXAMPLE 2.

An electrically conductive silicone rubber composition was prepared by blending 100 parts of a dimethyl polysiloxane having an average degree of polymerization of 320 and terminated at each molecular chain end with a dimethyl vinyl silyl group with 15 parts of a conductive furnace black (Ketjen Black EC, a product by Lion Akzo Co.) to give a conductive compound which was then uniformly admixed with 1.5 parts of the same methyl hydrogen polysiloxane as used in Example 1, 1.0 part of the same solution of chloroplatinic acid as used in Example 1, 0.05 part of methyl butynol and 1.0 part of dicumyl peroxide. The thus obtained conductive silicone rubber composition was introduced into an injection molding machine where it was deaerated and then injection-molded under the conditions of a molding temperature of 150° C., molding time of 20 seconds and injection pressure of 40 kg/cm² to give a cured conductive silicone rubber body.

Separately, an insulating silicone rubber composition was prepared by admixing 1.5 parts of dicumyl peroxide with a flowable silicone rubber compound consisting of 100 parts of an organopolysiloxane and 15 parts of a fumed silica filler having a specific surface area of 130 m²/g after a hydrophobic surface treatment.

The cured conductive silicone rubber body was placed in a metal mold for injection molding into which the insulating silicone rubber composition was injection-molded under the conditions of the molding temperature of 150° C., molding time of 20 seconds and injection pressure of 40 kg/cm² to give an integrally shaped silicone rubber body consisting of the conductive cured silicone rubber body and the vulcanizate of the insulating silicone rubber composition. This integral silicone rubber body was subjected to a secondary curing treatment by heating in an oven at 220° C. for 5 hours so as to fully decompose the dicumyl peroxide left undecomposed after the injection molding. The thus obtained integral silicone rubber body had a very smooth surface and curing of the rubber compositions was complete and uniform throughout the body.

The integral silicone rubber body was tested for the bonding strength at the interface between the insulating and conductive parts by holding the respective parts with the chucks of a tensile tester to be pulled apart. The result was that cohesive failure took place within the conductive silicone rubber without separation at the interface. The tensile strength at break was 18 kg/cm².

For comparison, a similar integrally shaped cured silicone rubber body was prepared by first compression-molding the insulating silicone rubber composition into an insulating cured silicone rubber body and then injection-molding the conductive silicone rubber composition into a metal mold of an injection molding machine containing the insulating cured silicone rubber body. The thus prepared comparative silicone rubber body was subjected to the same tensile test as above to find that adhesion failure took place at the interface between the insulating and conductive silicone rubber parts to give an adhesive bonding strength of 15 kg/cm². Each of the insulating and conductive silicone rubber parts had a small permanent compression set of about 10%.

For further comparison to evaluate the influence of the caebon black on curing, the same test as in the above given comparative test was repeated excepting replacement of the injection-molded conductive silicone rubber composition with the insulating silicone rubber composition which was injection-molded into a metal mold containing the insulating cured silicone rubber body under the same molding conditions as above. The result of the tensile test was that adhesion failure took place at the interface of the two parts to give an adhesive bonding strength of 17 kg/cm². The permanent compression set of each part was also about the same as above.

EXAMPLE 3.

An electrically conductive silicone rubber composition was prepared by first admixing 15 parts of the same conductive furnace black as used in Example 2 with 100 parts of a gum-like copolymeric organopolysiloxane consisting of 99.7% by moles of dimethyl siloxane units and 0.3% by moles of methyl vinyl siloxane units to give a carbon black-loaded organopolysiloxane compound which was then uniformly and rapidly admixed with 0.8 part of the same methyl hydrogen polysiloxane as used in Example 1, 0.2 part of the same solution of chloroplatinic acid as used in Example 1 and 1.0 part of 2,5-dimethyl-2,5-di(tert-butylperoxy) hexane. This conductive silicone rubber composition was compression-molded in a metal mold at 100° C. for 2 minutes under a pressure of 100 kg/cm$^2$ to give a conductive cured silicone rubber body.

Separately, an insulating silicone rubber composition was prepared by admixing 1.5 parts of 2,5-dimethyl-2,5-di(tert-butylperoxy) hexane with 100 parts of a silicone rubber compound containing 28.6% by weight of a precipitated silica filler. This insulating silicone rubber composition was introduced into a metal mold together with the conductive cured silicone rubber body and compression-molded therein at 170° C. for 10 minutes under a pressure of 100 kg/cm$^2$ to give an integrally shaped cured silicone rubber body having insulating and conductive parts firmly bonded together.

The result of the tensile test undertaken in the same manner as in Example 1 was that cohesive failure took place within the conductive silicone rubber body without separation at the interface between the two parts. The tensile strength at break was 40 kg/cm$^2$. The permanent compression set of the conductive and insulating parts determined in the same manner as in Example 1 was 12% and 9%, respectively. Substantially the same results of the adhesive bonding strength and permanent compression set were obtained when the 2.5-dimethyl-2,5-di(tert-butylperoxy) hexane was replaced with the same amount of dicumyl peroxide.

For comparison, the same conductive silicone rubber composition as above was prepared excepting omission of the peroxide in the formulation and cured into a conductive cured silicone rubber body which had a permanent compression set of 26% indicating the great advantageous effect of the non-acyl organic peroxide to decrease the permanent compression set.

EXAMPLE 4.

An electrically conductive silicone rubber composition was prepared by uniformly blending 100 parts of the same gum-like copolymeric organopolysiloxane as used in Example 1 with 50 parts of the same acetylene black also as used in Example 1 and 1.5 parts of dicumyl peroxide and the composition was compression-molded in a metal mold at a temperature of 150° C. for 10 minutes under a pressure of 100 kg/cm$^2$ to give a conductive cured silicone rubber body.

Separately, an insulating silicone rubber composition was prepared by uniformly blending 100 parts of the same gum-like copolymeric organopolysiloxane as used above with 0.4 part of the same methyl hydrogen polysiloxane as used in Example 1, 0.1 part of the same solution of chloroplatinic acid as used in Example 1, 0.02 part of methyl butynol and 1.5 parts of dicumyl peroxide.

The above prepared insulating silicone rubber composition was introduced into a metal mold together with the conductive cured silicone rubber body and compression-molded therein at 120° C. for 1 minute under a pressure of 100 kg/cm$^2$ to give an integrally shaped cured silicone rubber body having a conductive part and an insulating part which was subjected to a secondary curing treatment in an oven at 220° C. for 10 hours.

The thus obtained integrally shaped cured silicone rubber body was subjected to the tensile test in the same manner as in Example 1 to find that cohesive failure took place within the conductive silicone rubber without separation at the interface between the conductive and insulating parts. Each of these two parts had a permanent compression set of 9% as determined in the same manner as in Example 1. The values of the permanent compression set were 13% and 11% for the conductive and insulating parts, respectively, when the integrally shaped cured silicone rubber body was tested before the secondary curing treatment.

For comparison, the same experimental procedure as above was repeated excepting omission of the dicumyl peroxide in the formulation of the insulating silicone rubber composition to find that the values of the permanent compression set were 10% and 15% for the conductive and insulating parts, respectively.

EXAMPLE 5.

An insulating silicone rubber composition was prepared by uniformly blending 100 parts of the same dimethyl polysiloxane having an average degree of polymerization of 320 as used in Example 2 with 15 parts of the same hydrophobic-treated fumed silica filler as used in Example 2 to give a compound which was then further admixed with 1.5 parts of the same methyl hydrogen polysiloxane as used in the preceding example, 1.0 part of the same solution of chloroplatinic acid as used in the preceding example, 0.05 part of methyl butynol and 1.0 part of dicumyl peroxide. This insulating silicone rubber composition was deaerated in an injection molding machine and then injection-molded therein under the conditions of a molding temperature of 150° C., molding time of 20 seconds and injection pressure of 40 kg/cm$^2$ to give an insulating cured silicone rubber body.

Separately, a conductive silicone rubber composition was prepared by uniformly admixing 1.5 parts of dicumyl peroxide with a compound consisting of 100 parts of a liquid organopolysiloxane and 15 parts of the same conductive furnace black as used in Example 2. This conductive silicone rubber composition was injection-molded in a metal mold containing the above prepared insulating cured silicone rubber body under the conditions of a molding temperature of 150° C., molding time of 20 seconds and injection pressure of 40 kg/cm$^2$ to give an integrally shaped cured silicone rubber body having a conductive part and an insulating part which was then subjected to a secondary curing treatment in an oven at 200° C. for 5 hours. The thus obtained silicone rubber body had a very smooth surface and the condition of curing was complete and uniform throughout the body.

The result of the tensile test of this silicone rubber body undertaken in the same manner as in Example 1 was that cohesive failure took place within the conductive silicone rubber without separation at the interface between the conductive and insulating parts. The tensile strength at break was 18 kg/cm$^2$.

For comparison, a similar integrally shaped cured silicone rubber body was prepared by first injection-molding the same conductive silicone rubber composition as above alone into a conductive cured silicone rubber body and then injection-molding the same insulating silicone rubber composition as above in a metal mold containing the conductive cured silicone rubber body. The result of the tensile test undertaken with this integrally shaped cured silicone rubber body was that adhesion failure took place at the interface between the conductive and insulating parts to give an adhesive bonding strength of 15 kg/cm². Each of the conductive and insulating parts had a small permanent compression set of about 10%.

EXAMPLE 6.

An electrically insulating silicone rubber composition was prepared by uniformly admixing 100 parts of the same gum-like copolymeric organopolysiloxane as used in Example 3 first with 40 parts of the same precipitated silica filler as used in Example 3 and then rapidly with 0.5 part of the same methyl hydrogen polysiloxane as used in Example 3, 0.2 part of the same solution of chloroplatinic acid as used in Example 3 and 1.0 part of 2,5-dimethyl-2,5-di(tert-butylperoxy) hexane. This insulating silicone rubber composition was compression-molded in a metal mold under the conditions of a molding temperature of 100° C., molding time of 2 minutes and molding pressure of 100 kg/cm² to give an insulating cured silicone rubber body.

Separately, a conductive silicone rubber composition was prepared by uniformly blending 100 parts of the same gum-like copolymeric organoplysiloxane with 15 parts of the same conductive furnace black as used in Example 3 and 2.0 parts of 2,5-dimethyl-2,5-di(tert-butylperoxy) hexane. This conductive silicone rubber composition was introduced into another metal mold containing the insulating cured silicone rubber body and compression-molded under the conditions of a molding temperature of 170° C., molding time of 10 minutes and molding pressure of 100 kg/cm² followed by a secondary curing treatment in an oven at 220° C. for 4 hours to give an integrally shaped cured silicone rubber body having a conductive part and an insulating part.

The result of the tensile test conducted in the same manner as in Example 1 with this integrally shaped cured silicone rubber body was that cohesive failure took place within the conductive silicone rubber without separation at the interface between the conductive and insulating parts. The tensile strength at break was 40 kg/cm². The values of the permanent compression set measured in the same manner as in Example 1 were 12% and 10% for the conductive and insulating parts, respectively.

The same preparation and tests as above excepting replacement of the 2,5-dimethyl-2,5-di(tert-butylperoxy) hexane with the same amount of dicumyl peroxide as above gave substantially the same results as above.

For further comparison, another insulating cured silicone rubber body was prepared in the same formulation and in the same curing conditions as above excepting omission of the 2,5-dimethyl-2,5-di(tert-butylperoxy) hexane in the formulation of the composition. The permanent compression set of this comparative insulating silicone rubber body was 26% indicating the effectiveness of the non-acyl organic peroxide.

EXAMPLE 7.

An electrically insulating silicone rubber composition was prepared by uniformly blending 100 parts of a gum-like copolymeric organopolysiloxane containing $3.37 \times 10^{-3}$ mole of vinyl groups per 100 g as consisting of 99.75% by moles of dimethyl siloxane units and 0.25% by moles of methyl vinyl siloxane units with 50 parts of a precipitated silica filler, 45 parts of a fine silica powder as an extender, 0.2 part of a methyl hydrogen polysiloxane containing 1.6 moles of silicon-bonded hydrogen atoms per 100 g as consisting of dimethyl siloxane units and methyl hydrogen siloxane units with trimethyl silyl groups at the molecular chain ends, 0.08 part of a 5% by weight solution of chloroplatinic acid in 2-ethylhexyl alcohol, 1.0 part of a 2% by weight solution of benzotriazole in ethyl alcohol and 1.5 parts of dicumyl peroxide. This insulating silicone rubber composition was introduced into a metal mold and compression-molded therein under the conditions of a molding temperature of 160° C., molding time of 10 minutes and molding pressure of 100 kg/cm² to give an insulating cured silicone rubber body.

Separately, a conductive silicone rubber composition was prepared by uniformly blending 100 parts of a gum-like copolymeric organopolysiloxane consisting of 99.85% by moles of dimethyl siloxane units and 0.15% by moles of methyl vinyl siloxane units, 3 parts of another gum-like copolymeric organopolysiloxane consisting of 97% by moles of dimethyl siloxane units and 3% by moles of methyl vinyl siloxane units, 60 parts of the same conductive acetylene black as used in Example 1, 0.4 part of the same methyl hydrogen polysiloxane as used above, 0.08 part of the same solution of chloroplatinic acid as used above and 2.0 parts of dicumyl peroxide. This conductive silicone rubber composition was introduced into a metal mold containing the insulating cured silicone rubber body prepared above and compression-molded under the conditions of a molding temperature of 160° C., molding time of 10 minutes and molding pressure of 50 kg/cm² to give an integrally shaped cured silicone rubber body having a conductive part and an insulating part bonded together, which was then subjected to a secondary curing treatment in an oven at 220° C. for 8 hours.

This integral silicone rubber body was subjected to the tensile test in the same manner as in Example 1 to give a result that cohesive failure took place within the conductive silicone rubber part without separation at the interface between the conductive and insulating parts. Each of the conductive and insulating parts exhibited about 10% of the permanent compression set as determined in the same manner as in Example 1.

For comparison, the same integrally shaped cured silicone rubber body as above was subjected to the measurement of the permanent compression set either before the secondary curing treatment or after 8 hours of the secondary curing treatment at 150° C. instead of 220° C. to give values of 15% and 13%, respectively, for the conductive parts and 13% and 12%, respectively, for the insulating parts.

For further comparison, the same preparation and tests as above including the secondary curing treatment for 8 hours at 220° C. were repeated excepting omission of the dicumyl peroxide in the formulation of each of the insulating and conductive silicone rubber compositions to find that adhesion failure took place in the tensile test at the interface between the conductive and insulating parts although some traces of the carbon black-loaded silicone rubber were found on the surface of the insulating part. The values of the permanent compression set were 23% and 21% in the conductive and insulating parts, respectively.

EXAMPLE 8.

An electrically conductive silicone rubber composition was prepared by uniformly blending 100 parts of a gum-like copolymeric organopolysiloxane containing $4.05 \times 10^{-3}$ mole per 100 g as cosisting of 99.7% by moles of dimethyl siloxane units and 0.3% by moles of methyl vinyl siloxane units with 15 parts of the same conductive furnace black as used in Example 2, 0.05 part of a methyl hydrogen polysiloxane containing 0.74 mole of the silicon-bonded hydrogen atoms per 100 g as consisting of dimethyl siloxane units and methyl hydrogen siloxane units with trimethyl silyl groups at the molecular chain ends, 0.1 part of a 5% by weight solution of chloroplatinic acid in isopropyl alcohol, 0.5 part of a 2% by weight solution of benzotriazole in ethyl alcohol and 1.5 parts of 2,5-dimethyl-2,5-di(tert-butylperoxy) hexane. This conductive silicone rubber composition was introduced into a metal mold and compression-molded therein under the conditions of a molding temperature of 175° C., molding time of 7 minutes and molding pressure of 55 kg/cm$^2$ to give a conductive cured silicone rubber body.

Separately, an insulating silicone rubber composition was prepared by uniformly blending 100 parts of a dimethyl polysiloxane having a viscosity of 10,000 centistokes at 25° C. and containing $4.7 \times 10^{-3}$ mole of vinyl groups per 100 g as the dimethyl vinyl silyl groups at the molecular chain ends first with 15 parts of the same fumed silica filler after a hydrophobic surface treatment as used in Example 2 and then with 2 parts of the same methyl hydrogen polysiloxane as used above, 0.1 part of the same benzotriazole solution as used above, 0.8 part of 2,5-dimethyl-2,5-di(tert-butylperoxy) hexane and 0.2 part of the same solution of chloroplatinic acid as used above. This insulating silicone rubber composition was injection-molded into a metal mold containing the conductive cured silicone rubber body under the conditions of a molding temperature of 150° C., molding time of 3 minutes and injection pressure of 35 kg/cm$^2$ to give an integrally shaped cured silicone rubber body having a conductive part and an insulating part bonded together which was subjected to a secondary curing treatment in an oven at 200° C. for 4 hours. The result of the tensile test undertaken with this cured silicone rubber body in the same manner as in Example 1 was that adhesion failure took place at the interface between the conductive and insulating parts to give an adhesive bonding strength of 16 kg/cm$^2$. Each of the conductive and insulating parts exhibited about 10% of the permanent compression set.

EXAMPLE 9.

An insulating cured silicone rubber body was prepared by injection-molding the same insulating silicone rubber composition prepared in Example 8 under the same conditions of injection molding as in Example 8.

Separately, a conductive silicone rubber composition was prepared in the same formulation as for the insulating silicone rubber composition prepared in Example 8 excepting replacement of the fumed silica filler with the same amount of the same conductive furnace black as used in Example 2. This conductive silicone rubber composition was injection-molded into a metal mold containing the insulating cured silicone rubber body under the conditions of a molding temperature of 150° C., molding time of 3 minutes and injection pressure of 50 kg/cm$^2$ to give an integrally shaped cured silicone rubber body having a conductive part and an insulating part which was then subjected to a secondary curing treatment in an oven at 200° C. for 8 hours. Each of the conductive and insulating parts of the thus obtained silicone rubber body exhibited permanent compression set of 10 to 11%.

EXAMPLE 10.

An electrically conductive silicone rubber composition was prepared by uniformly blending 100 parts of the same gum-like vinyl-containing organopolysiloxane as used in Example 8 with 40 parts of the same conductive acetylene black as used in Example 1, 0.8 part of a trimethylsilyl-terminated methyl hydrogen polysiloxane containing 0.58 mole of the silicon-bonded hydrogen atoms per 100 g, 0.1 part of a 5% by weight solution of chloroplatinic acid in ethyl alcohol and 2 parts of dicumyl peroxide.

Separately, an insulating silicone rubber composition was prepared in the same formulation as above excepting replacement of the conductive acetylene black with the same amount of a fumed silica filler having a specific surface area of 110 m$^2$/g.

These two silicone rubber compositions were introduced together into a metal mold and the air remaining at the interface between these two compositions was removed in a vacuum press. Thereafter, the compositions in contact with each other in the metal mold were heated for 10 minutes by the irradiation with a farinfrared radiation heater at 180° C. without compression and then subjected to a secondary curing treatment in an oven at 220° C. for 4 hours to give a cured silicone rubber body having a conductive part and an insulating part integrally bonded together. The adhesive bonding strength between these two parts was 25 kg/cm$^2$ in the tensile test though sometimes with cohesive failure. The values of the permanent compression set were 9% and 8% for the conductive and insulating parts, respectively.

What is claimed is:

1. A method for the preparation of an integral silicone rubber article having an electrically insulating part and an electrically conductive part which comprises the steps of:
    (a) curing a first silicone rubber composition comprising an organopolysiloxane and a non-acyl organic peroxide as a curing agent by heating to give a first cured silicone rubber body;
    (b) contacting the first cured silicone rubber body with a second silicone rubber composition comprising an organopolysiloxane and a non-acyl organic peroxide; and
    (c) curing the second silicone rubber composition in contact with the first cured silicone rubber body by heating at a temperature of 100° C. to 180° C. for a length of time of 5 seconds to 20 minutes to give a second cured silicone rubber body which is adhesively and integrally bonded to the first cured silicone rubber body, either one of the first and the second silicone rubber compositions further comprising a carbon black in such an amount as to impart the cured silicone rubber body of the composition with substantial electroconductivity and at least one of the first and the second silicone rubber compositions comprising an organopolysiloxane having at least two vinyl groups bonded to the silicon atoms in a molecule as the organopolysiloxane and further comprising an organohydrogenpolysiloxane and a platinum compound as a catalyst.

2. The method for the preparation of an integral silicone rubber article having an electrically insulating part and an electrically conductive part as claimed in claim 1 wherein the second silicone rubber composition comprises the carbon black, the organohydrogenpolysiloxane and the platinum compound.

3. The method for the preparation of an integral silicone rubber article having an electrically insulating part and an electrically conductive part as claimed in claim 1 wherein the first silicone rubber composition comprises the carbon black, the organohydrogenpolysiloxane and the platinum compound.

4. The method for the preparation of an integral silicone rubber article having an electrically insulating part and an electrically conductive part as claimed in claim 1 wherein the first silicone rubber composition comprises the carbon black and the second silicone rubber composition comprises the organohydrogenpolysiloxane and the platinum compound.

5. The method for the preparation of an integral silicone rubber article having an electrically insulating part and an electrically conductive part as claimed in claim 1 wherein the second silicone rubber composition comprises the carbon black and the first silicone rubber composition comprises the organohydrogenpolysiloxane and the platinum compound.

6. The method for the preparation of an integral silicone rubber article having an electrically insulating part and an electrically conductive part as claimed in claim 1 wherein the second silicone rubber composition comprises the carbon black, the organohydrogenpolysiloxane and the platinum compound and the first silicone rubber composition comprises the organohydrogenpolysiloxane and the platinum compound.

7. The method for the preparation of an integral silicone rubber article having an electrically insulating part and an electrically conductive part as claimed in claim 1 wherein the first silicone rubber composition comprises the carbon black, the organohydrogenpolysiloxane and the platinum compound and the second silicone rubber composition comprises the organohydrogenpolysiloxane and the platinum compound.

8. The method for the preparation of an integral silicone rubber article having an electrically insulating part and an electrically conductive part as claimed in claim 1 wherein the non-acyl organic peroxide is selected from the group consisting of hydrocarbyl hydroperoxides, dialkyl peroxides, ketal peroxides and ester peroxides.

9. The method for the preparation of an integral silicone rubber article having an electrically insulating part and an electrically conductive part as claimed in claim 1 wherein the non-acyl organic peroxide is dicumyl peroxide or 2,5-dimethyl-2,5-di(tert-butylperoxy) hexane.

10. The method for the preparation of an integral silicone rubber article having an electrically insulating part and an electrically conductive part as claimed in claim 1 wherein the amount of the non-acyl organic peroxide is in the range from 1 to 5 parts by weight per 100 parts by weight of the organopolysiloxane.

11. The method for the preparation of an integral silicone rubber article having an electrically insulating part and an electrically conductive part as claimed in claim 1 wherein the organohydrogenpolysiloxane has at least two hydrogen atoms directly bonded to the silicone atoms in a molecule.

12. The method for the preparation of an integral silicone rubber article having an electrically insulating part and an electrically conductive part as claimed in claim 10 wherein the amount of the organohydrogenpolysiloxane is sufficient to provide from 0.5 to 6 moles of the hydrogen atoms directly bonded to the silicone atoms per mole of the vinyl groups in the organopolysiloxane.

13. The method for the preparation of an integral silicone rubber article having an electrically insulating part and an electrically conductive part as claimed in claim 1 wherein the platinum compound is chloroplatinic acid.

14. The method for the preparation of an integral silicone rubber article having an electrically insulating part and an electrically conductive part as claimed in claim 1 wherein the amount of the platinum compound is in the range from 50 to 2000 ppm as platinum based on the amount of the organopolysiloxane.

15. The method for the preparation of an integral silicone rubber article having an electrically insulating part and an electrically conductive part as claimed in claim 1 which further comprises: (d) subjecting the integral silicone rubber body obtained in step (c) to a secondary curing treatment by heating at a temperature in the range from 200° C. to 250° C. for a length of time of at least 4 hours.

16. The method of claim 1 in which the amount of carbon black used to employ substantial conductivity to either one of the first or second silicone rubber compositions is in a range of 5 to 75 parts per 100 parts by weight of the organopolysiloxane.

* * * * *